No. 863,153. PATENTED AUG. 13, 1907.
W. M. COFFMAN.
LUBRICATING BEARINGS.
APPLICATION FILED FEB. 27, 1906.

Witnesses:

Inventor:
Walter M. Coffman.
By
Atty.

UNITED STATES PATENT OFFICE.

WALTER M. COFFMAN, OF MADISON, WISCONSIN, ASSIGNOR TO NORTHERN ELECTRICAL MANUFACTURING COMPANY, A CORPORATION OF WISCONSIN.

LUBRICATING BEARINGS.

No. 863,153.	Specification of Letters Patent.	Patented Aug. 13, 1907.

Application filed February 27, 1906. Serial No. 303,169.

*To all whom it may concern:*

Be it known that I, WALTER M. COFFMAN, a citizen of the United States, residing at Madison, in the county of Dane and State of Wisconsin, have invented certain new and useful Improvements in Lubricating Bearings, of which the following is a specification.

My present invention is an automatic lubricating device particularly intended for oiling the bearings of vertical shafts.

In carrying out my invention I have designed an oil conveying device driven by the rotation of the shaft to be lubricated, which will move the lubricating material in the right direction when the shaft turns regardless of its direction of turning.

The various novel features of construction and arrangement which characterize my invention are pointed out with particularity in the claims annexed to and forming a part of this specification.

For a better understanding of my invention and the advantages possessed by it, however, reference may be had to the accompanying drawings and descriptive matter in which I have illustrated and described one of the forms in which my invention may be embodied.

Figure 1:
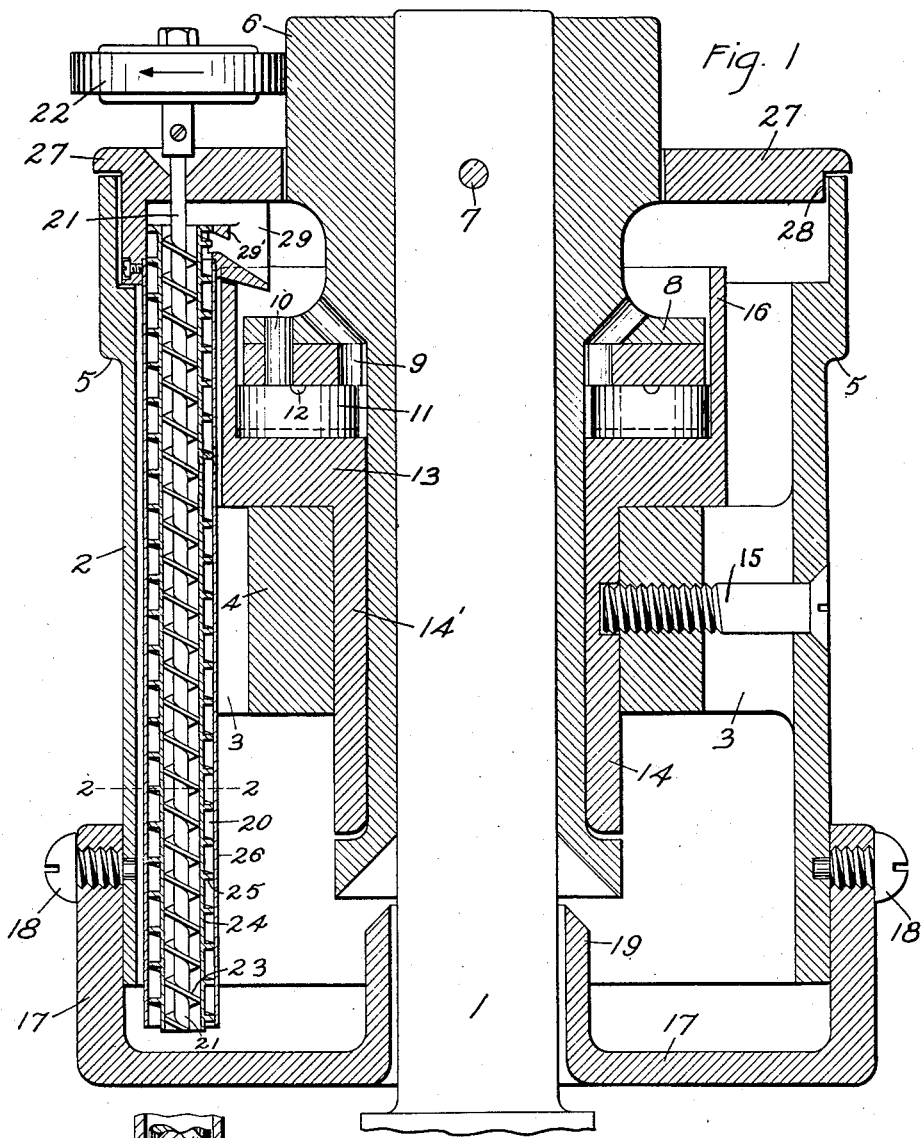
Figure 3:
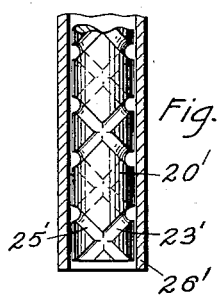
Figure 2:
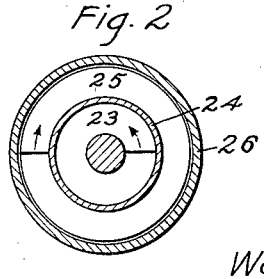

In the drawings, Figure 1 is a sectional elevation of a vertical shaft bearing; Fig. 2 is a section of the oil conveyer on the line 2 2 of Fig. 1; and Fig. 3 is a partial elevation of a modified form of conveyer with the inclosing tube in section.

Referring to the drawings, 1 represents a rotating shaft which is journaled in and has its weight supported in whole or in part by a thrust bearing located in a box 2. As shown, the bearing box 2 is provided interiorly with integral arms 3 the inner ends of which are united to a ring-like portion 4. The box 2 is provided externally with a shoulder 5 adapted to be engaged by the supporting means for the bearing box.

To the shaft 1 is secured a sleeve 6 in any suitable manner as by a pin 7. The sleeve 6 which may be formed of steel is provided with a radial flange portion 8. To the underside of the flange portion 8 is secured a brass collar 9 by means of dowel pins 10. Beneath the collar 9 and surrounding the adjacent portions of the sleeve is arranged a series of steel disks 11. Each disk 11 has a diametrically extending groove 12 formed in each face. The grooves in opposite faces of each disk extend at right angles to each other. The disk 11 rests upon the radial portions 13 of a sleeve 14, which may be formed of hardened bronze, brass or other suitable material. The sleeve 14 which in the construction shown is split, the two halves being secured in place by means of a set-screw 15, rests upon and is supported by the ring portion 4. As shown, the sleeve 14 is provided at its upper end with a cylindrical portion 16 which surrounds the flange portion 8, ring or collar 9, and disks 11. The body portion 14' of the sleeve 14 serves as a bearing sleeve to prevent lateral displacement of the shaft 1.

To the lower end of the box 2 is secured a bottom member 17 by means of screws 18. The bottom member is provided with an upwardly extending tubular boss 19 which surrounds the shaft 1 and has its upper end so arranged with respect to the lower end of the sleeve 6 and the sleeve 14 that oil passing between them drips into the space between the outer wall of the bottom member 17 and the boss 19 which forms an oil reservoir.

Lubricating material is carried to the bearing from the receptacle formed by the bottom member 17 by a screw conveyer 20. In the form of my invention disclosed in Fig. 1, the screw conveyer 20 comprises a shaft 21 to the upper end of which is secured a friction disk 22. A helical thread or rib 23 surrounds the major portion of the shaft 20 to which it is secured. The thread 23 is inclosed by a tubular member 24. The tubular member 24 is rigidly secured to the shaft 21 in any suitable manner as by brazing it to the outer edge of the rib 23. The tubular member 24 is provided exteriorly with a helical thread or rib 25. As shown, the rib 25 forms a right hand screw while the rib 23 forms a left hand screw. The helical conveyer rib 25 is inclosed by a non-rotatable tubular member 26. The upper end of the member 26 is secured to a collar member 27 which surrounds the sleeve 6 and is provided with a cylindrical shoulder 28 which fits loosely within the upper end of the box 2. The portion of the shaft 21 immediately below the disk 22 is journaled in the member 27. As shown, the member 27 is provided with a spout portion 29 which rests upon the upper end of the cylindrical portion 16 of the split sleeve 14. The lubricating fluid carried upward by either of the conveyer ribs 23 or 25 escapes at the upper end of the conveyer into the spout 29 from which it flows into the space inclosed by the cylindrical portion 16.

It will be readily apparent that the member 27 serves not only as a cover for the bearing but also as a weighted arm pivoted at the point of engagement of the spout 29 with the portion 16 which holds the disk 22 constantly against the sleeve 6 with a constant pressure. This is facilitated by the inclination given to the under surface of the spout 29 and the coöperating surface of the tubular shell 16. As a result a rotation of the shaft 1 will through the sleeve 6 produce a corresponding rotation of the disk 22. When the rotation of the shaft 1 is such as to cause the rotation of the disk in the direction of the arrow, oil will be moved from the reservoir formed by the bottom member 16 by the conveyer rib 25. When the direction of rotation of the shaft is reversed, oil will similarly be elevated by the conveyer rib 23. It will thus be observed that the operation of the lubricating device is independent of the direction of rotation of the shaft. When one screw conveyer is elevating oil the other is inoperative or practically so, since there is no appreciable supply of oil to be carried down available at its upper end. The diaphragm 29' surrounding the upper outturned end of the member 27 and serving to separate the upper ends of the two conveyers is desirable but not essential in this connection.

The parts should be so proportioned that the conveyer elevates oil practically as fast as it leaks through the bearings, though if the oil is elevated slightly faster no injurious consequences can result since the oil merely escapes out of the upper end of the reservoir formed by the shell like portion 16 of the sleeve 14.

As shown, the portion 16 may be notched to receive the spout 29, this arrangement serving to prevent displacement of the oil conveyer.

Instead of separating the two conveyers by the tubular casing 24, I may simply form left and right grooves 23' and 25' in the shaft 20', as I have found that with this simple construction oil will be conveyed from the reservoir to the bearing regardless of the direction of the rotation of the shaft 1. It will, of course, be understood that the conveying member in this construction, which is shown in Fig. 3, should be inclosed by a suitable casing or shell 26'.

The steel disks in the construction shown tend to rotate about their own axes. As a result, the bearing surface of the sleeve 14 and the collar 9 do not become grooved. The oil grooves in the disks properly lubricate the entire bearing surface of the sleeve 14 and collar 9. I make no claim in the present application, however, to the arrangement of the disks and coöperating surfaces as they are described and claimed in an application filed concurrently herewith.

What I claim as new and desire to secure by Letters Patent of the United States, is,

1. In combination, a vertical shaft, a bearing therefor to be lubricated, an oil reservoir, and means for conveying oil from the reservoir to the bearing comprising a screw pump, the axis of which is substantially parallel to the axis of the shaft and which is provided with a fricton disk engaging said shaft, and a weighted lever arm for holding said disk against said shaft.

2. In combination, a vertical shaft, a bearing therefor, an oil reservoir, spiral conveyers rotated by the shaft arranged so that when the shaft rotates in one direction one of said conveyers carries oil from the reservoir to the bearing and when the shaft rotates in the opposite direction the other of said conveyers carries oil from the reservoir to the bearing.

3. In combination, a vertical rotating shaft, a bearing box surrounding said shaft and provided at its lower end with an oil reservoir, and above said oil reservoir with a thrust bearing for the shaft, and a single rotating member in frictional engagement with the shaft and rotated thereby for conveying oil from the reservoir to the bearing, said member having two spiral oil conveying threads or grooves, the pitch of the two threads being reversed hereby oil is carried from the reservoir to the bearing with either direction of rotation of the shaft.

4. In combination, a shaft, a bearing member therefor provided with an annular wall surrounding the shaft and arranged to form a receptacle for lubricating material, a reservoir located below said receptacle, and a screw conveyer for carrying lubricating material from said reservoir to said receptacle, said conveyer being provided with a spout which rests upon the upper end of said annular wall, and with a friction disk which engages the rotating shaft, and a weighted arm secured to said spout for holding said disk in engagement with the shaft.

5. In combination, a shaft, a bearing therefor, a screw conveyer rotated by the shaft for lubricating said bearing, and a cover for the bearing, the weight of which regulates the driving connection between the conveyer and the shaft.

In witness whereof, I have hereunto set my hand this 21st day of Feby., 1906.

WALTER M. COFFMAN.

Witnesses:
H. L. MORRIS,
A. REGAN.